United States Patent
Kim et al.

(10) Patent No.: US 10,414,431 B2
(45) Date of Patent: Sep. 17, 2019

(54) CONTROL APPARATUS AND METHOD OF MOTOR DRIVEN POWER STEERING SYSTEM

(71) Applicant: HYUNDAI MOBIS CO., LTD., Seoul (KR)

(72) Inventors: Moon Su Kim, Anyang-si (KR); Ji Hoon Yoo, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 10 days.

(21) Appl. No.: 15/686,585

(22) Filed: Aug. 25, 2017

(65) Prior Publication Data

US 2018/0057040 A1  Mar. 1, 2018

(30) Foreign Application Priority Data

Aug. 26, 2016 (KR) .................. 10-2016-0108903

(51) Int. Cl.
| | | |
|---|---|---|
| *B62D 5/04* | (2006.01) | |
| *B62D 6/10* | (2006.01) | |
| *H02P 6/16* | (2016.01) | |

(52) U.S. Cl.
CPC .......... *B62D 5/049* (2013.01); *B62D 5/0463* (2013.01); *B62D 5/0484* (2013.01);
(Continued)

(58) Field of Classification Search
CPC .................................... B62D 5/04; B62D 6/10
(Continued)

(56) References Cited

U.S. PATENT DOCUMENTS

| | | | | |
|---|---|---|---|---|
| 4,660,671 A | * | 4/1987 | Behr ............... | B62D 5/049 180/404 |
| 6,467,360 B1 | * | 10/2002 | Bogdanov ........ | B62D 6/10 73/862.333 |

(Continued)

FOREIGN PATENT DOCUMENTS

| | | |
|---|---|---|
| JP | 2005-335591 A | 12/2005 |
| JP | 2012-111335 A | 6/2012 |

(Continued)

*Primary Examiner* — Jorge L Carrasquillo
*Assistant Examiner* — Devon A Joseph
(74) *Attorney, Agent, or Firm* — Knobbe Martens Olson & Bear LLP (57) ABSTRACT

A control apparatus of an MDPS system may include: a current supply unit configured to drive a motor by injecting a preset frequency and magnitude of current to the motor; a torque sensor configured to sense a torque of a steering shaft; a hall sensor fault determination unit configured to determine whether a fault has occurred in a hall sensor; a torque signal processing unit configured to process a signal outputted from the torque sensor and calculate the magnitude of a torque signal; an encoder fault determination unit configured to determine whether a fault has occurred in an encoder, using the torque signal outputted from the torque signal processing unit; and a motor control unit configured to acquire a position of a motor rotor according to the determination results of the hall sensor fault determination unit and the encoder fault determination unit, and control the operation of the motor.

7 Claims, 5 Drawing Sheets

(52) U.S. Cl.
    CPC ............. *B62D 5/0493* (2013.01); *B62D 6/10* (2013.01); *H02P 6/16* (2013.01)

(58) Field of Classification Search
    USPC .......................................................... 318/638
    See application file for complete search history.

(56) References Cited

U.S. PATENT DOCUMENTS

| | | | | |
|---|---|---|---|---|
| 9,989,384 | B2* | 6/2018 | Scotson | ................... G01P 3/489 |
| 2003/0233181 | A1* | 12/2003 | Colosky | ................. B62D 5/049 |
| | | | | 701/43 |
| 2006/0176005 | A1* | 8/2006 | Ta | ............................ H02P 6/182 |
| | | | | 318/650 |
| 2006/0266575 | A1* | 11/2006 | Nagase | .................. B62D 5/046 |
| | | | | 180/446 |
| 2011/0316466 | A1* | 12/2011 | Uryu | ..................... B62D 5/0484 |
| | | | | 318/490 |
| 2012/0296525 | A1* | 11/2012 | Endo | ..................... B62D 5/0466 |
| | | | | 701/42 |
| 2014/0102219 | A1* | 4/2014 | Kuwahara | .............. B62D 5/049 |
| | | | | 73/862.333 |
| 2016/0233804 | A1* | 8/2016 | Furutani | .................... H02P 6/16 |
| 2017/0137054 | A1* | 5/2017 | Farrelly | ............... B62D 5/0493 |
| 2017/0158231 | A1* | 6/2017 | Farrelly | .................... B62D 6/10 |
| 2018/0022379 | A1* | 1/2018 | Sasaki | .................... B62D 3/126 |
| | | | | 701/41 |

FOREIGN PATENT DOCUMENTS

| | | | |
|---|---|---|---|
| JP | 2016-113031 A | 6/2016 | |
| KR | 10-2013-0044730 A | 5/2013 | |
| KR | 10-2015-0065986 A | 6/2015 | |
| KR | 10-1551038 B1 | 9/2015 | |

* cited by examiner

CONTROL APPARATUS AND METHOD OF MOTOR DRIVEN POWER STEERING SYSTEM

CROSS-REFERENCES TO RELATED APPLICATIONS

The present application claims priority to Korean application number 10-2016-0108903, filed on Aug. 25, 2016, which is incorporated by reference in its entirety.

BACKGROUND OF THE INVENTION

The present invention relates to a control apparatus of a motor driven power steering (MDPS) system, and more particularly, to a control apparatus of an MDPS system, which determines whether a fault has occurred in a hall sensor or encoder for sensing a position of a motor rotor, and controls a motor according to the determination result.

The MDPS system has a relatively small weight, occupies a relatively small space, and does not need an oil change, compared to an existing hydraulic power steering system. The MDPS system provides part of a steering torque which a driver needs to apply to a steering wheel during a steering operation, using an auxiliary power unit, thereby facilitating the steering operation.

That is, the MDPS system senses the driver's steering intention through a torque sensor connected to the steering wheel, and drives a motor to provide a proper force in consideration of the current vehicle velocity or the like, thereby assisting a steering force. When a vehicle is stopped/parked or driven at a low velocity, the MDPS system provides a large force to lessen the driver's force. When the vehicle is driven at a high velocity, the MDPS system provides only a small force to maintain the stability of vehicle body.

The related art of the present invention is disclosed in Korean Patent Publication No. 10-2015-0065986 published on Jun. 16, 2015 and entitled "Electronic control unit for detecting breakdown of motor position sensor".

The conventional MDPS system cannot control the operation of the motor, when a fault has occurred in a hall sensor or encoder for sensing a position of the motor rotor. Thus, the MDPS system may not be normally operated either.

When a fault occurs in the hall sensor or encoder while the vehicle is driven, the MDPS system cannot normally assist a steering force. In this case, the vehicle may be exposed to the danger of an accident. Therefore, there is a demand for a system capable of determining whether a fault has occurred in the hall sensor or the encoder, and normally controlling the operation of the motor even though a fault has occurred in the hall sensor and the encoder.

SUMMARY OF THE INVENTION

Various embodiments of the present invention are directed to a control apparatus of an MDPS system, which is capable of determining whether a fault has occurred in a hall sensor or encoder for sensing a position of a motor rotor, and normally controlling a motor by estimating the position of the motor rotor according to the determination result.

Also, various embodiments of the present invention are directed to a control apparatus of an MDPS system, which is capable of controlling a motor by estimating a position of a motor rotor when a fault has occurred in a hall sensor and an encoder, thereby improving the fail safety of the MDPS system.

In one embodiment, a control apparatus of an MDPS system may include: a torque sensor configured to sense a torque of a steering shaft; and a hall sensor fault determination unit configured to determine whether a fault has occurred in a hall sensor, according to one or more of the torque sensed by the torque sensor and a status value of the hall sensor.

The hall sensor fault determination unit may determine that a fault has occurred in the hall sensor, when the status value of the hall sensor corresponds to a preset fault determination value.

The hall sensor fault determination unit may determine that a fault has occurred in the hall sensor, when the status value of the hall sensor is not changed and the torque sensed by the torque sensor is larger by a preset value or more than a preset normal range.

In another embodiment, a control apparatus of an MDPS system may include: a current supply unit configured to drive a motor by injecting a preset frequency and magnitude of current to a motor; a torque sensor configured to sense a torque of a steering shaft rotated by the motor; a torque signal processing unit configured to process a signal outputted from the torque sensor and calculate the magnitude of a torque signal generated through the current applied by the current supply unit; and an encoder fault determination unit configured to determine whether a fault has occurred in an encoder, using the magnitude of the torque signal outputted from the torque signal processing unit.

The current supply unit may include: a current frequency injection unit configured to inject a preset frequency and magnitude of current to a d-axis of a motor; and a motor current control unit configured to couple the current injected by the current frequency injection unit to a current applied to the d-axis of the motor, and perform current vector control to apply a current to the d- and q-axes of the motor.

The frequency of the current supplied by the current supply unit may be higher than a frequency generated by a driver's steering effort.

The encoder fault determination unit may compare the magnitude of a stored torque ripple for an encoder fault to the magnitude of the torque signal inputted from the torque signal processing unit, and determine that a fault has occurred in the encoder, when an encoder error in magnitude between the torque ripple and the torque signal is equal to or more than a preset error.

In another embodiment, a control apparatus of an MDPS system may include: a current supply unit configured to drive a motor by injecting a preset frequency and magnitude of current to the motor; a torque sensor configured to sense a torque of a steering shaft rotated by the motor; a hall sensor fault determination unit configured to determine whether a fault has occurred in a hall sensor, according to one or more of the torque sensed by the torque sensor and a status value of the hall sensor; a torque signal processing unit configured to process a signal outputted from the torque sensor and calculate the magnitude of a torque signal generated through the current applied by the current supply unit; an encoder fault determination unit configured to determine whether a fault has occurred in an encoder, using the torque signal outputted from the torque signal processing unit; and a motor control unit configured to acquire a position of a motor rotor according to the determination results of the hall sensor fault determination unit and the encoder fault determination unit, and control the operation of the motor.

The motor control unit may control the motor based on a motor rotor position measured by the encoder when the hall sensor fault determination unit determines that a fault has occurred in the hall sensor and the encoder fault determination unit determines that the encoder is normal, and control the motor based on a motor rotor position measured by the hall sensor when the hall sensor fault determination unit determines that the hall sensor is normal and the encoder fault determination unit determines that a fault has occurred in the encoder.

When the hall sensor fault determination unit determines that a fault has occurred in the hall sensor and the encoder fault determination unit determines that a fault has occurred in the encoder, the motor control unit may estimate the position of the motor rotor, and control the motor based on the estimated motor rotor position.

The motor control unit may detect a position value corresponding to the magnitude of the torque signal inputted from the torque signal processing unit, and estimate the position of the motor rotor by applying the detected position value to the finally detected position of the motor rotor.

The hall sensor fault determination unit may determine that a fault has occurred in the hall sensor, when the status value of the hall sensor corresponds to a preset fault determination value.

The hall sensor fault determination unit may determine that a fault has occurred in the hall sensor, when the status value of the hall sensor is not changed and the torque sensed by the torque sensor is larger by a preset value than a preset normal range.

The current supply unit may include: a current frequency injection unit configured to inject the preset frequency and magnitude of current to a d-axis of the motor; and a motor current control unit configured to couple the current injected by the current frequency injection unit to a current applied to the d-axis of the motor, and perform current vector control to apply a current to the d- and q-axes of the motor.

The frequency of the current supplied by the current supply unit may be higher than a frequency generated by a driver's steering effort.

The encoder fault determination unit may compare the magnitude of a stored torque ripple for an encoder fault to the magnitude of the torque signal inputted from the torque signal processing unit, and determine that a fault has occurred in the encoder, when an encoder error in magnitude between the torque ripple and the torque signal is equal to or more than a preset error.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
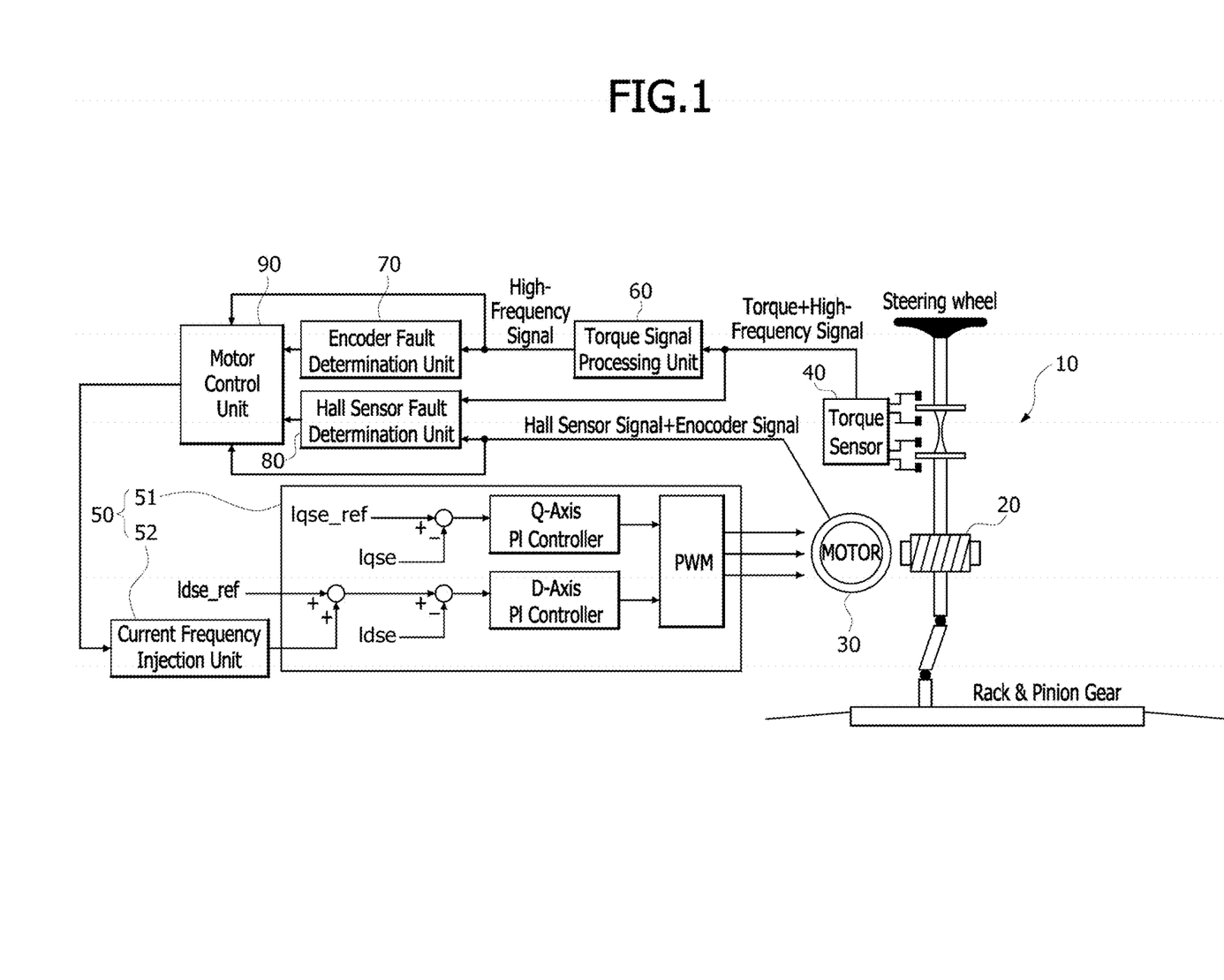
FIG. 1 is a block diagram illustrating a control apparatus of an MDPS system in accordance with an embodiment of the present invention.
Figure 2:
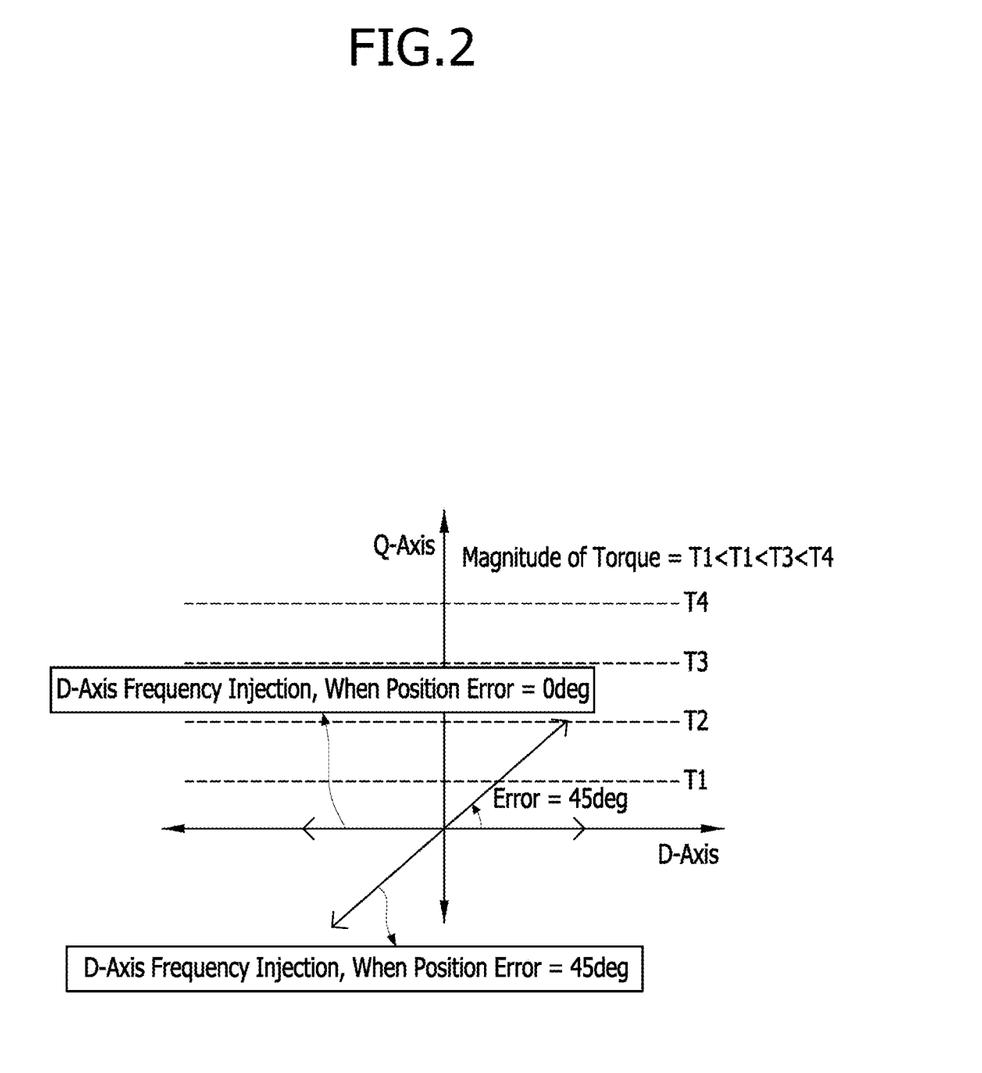
FIG. 2 illustrates torques depending on the magnitudes of d- and q-axis currents during motor current vector control in accordance with the embodiment of the present invention.
Figure 3:
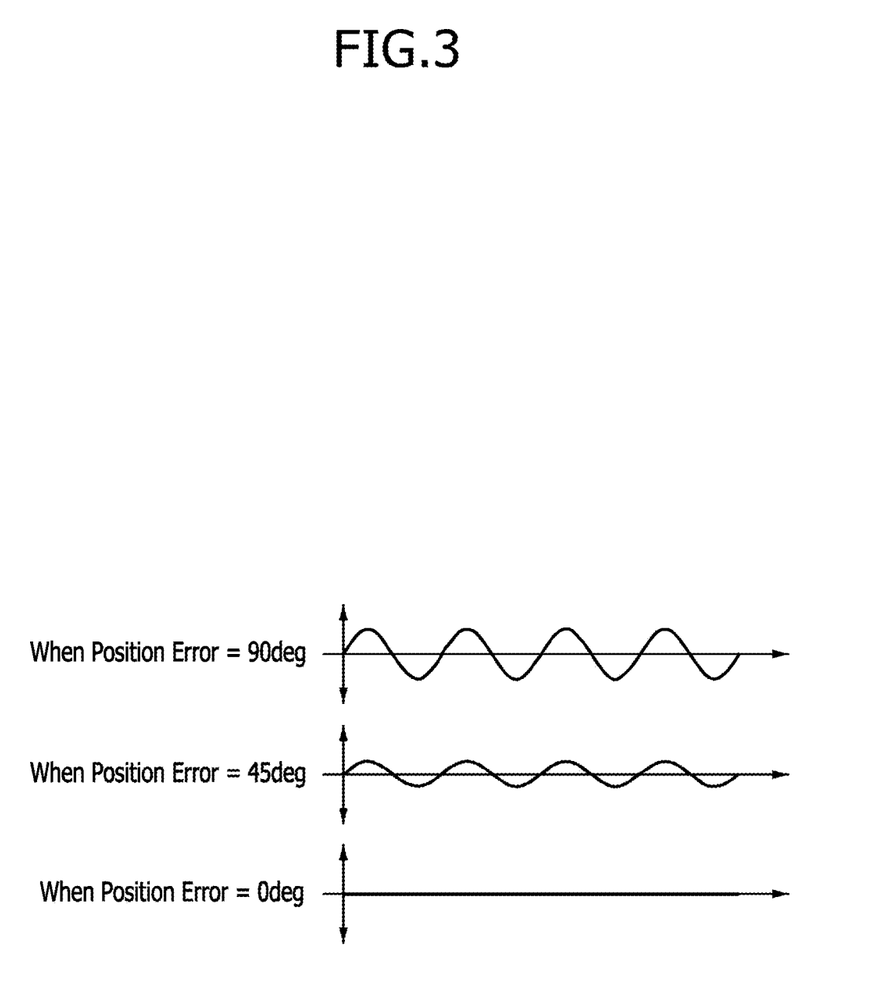
FIG. 3 illustrates torque sensor output signals depending on position errors when a d-axis current frequency is applied in accordance with the embodiment of the present invention.
Figure 4:
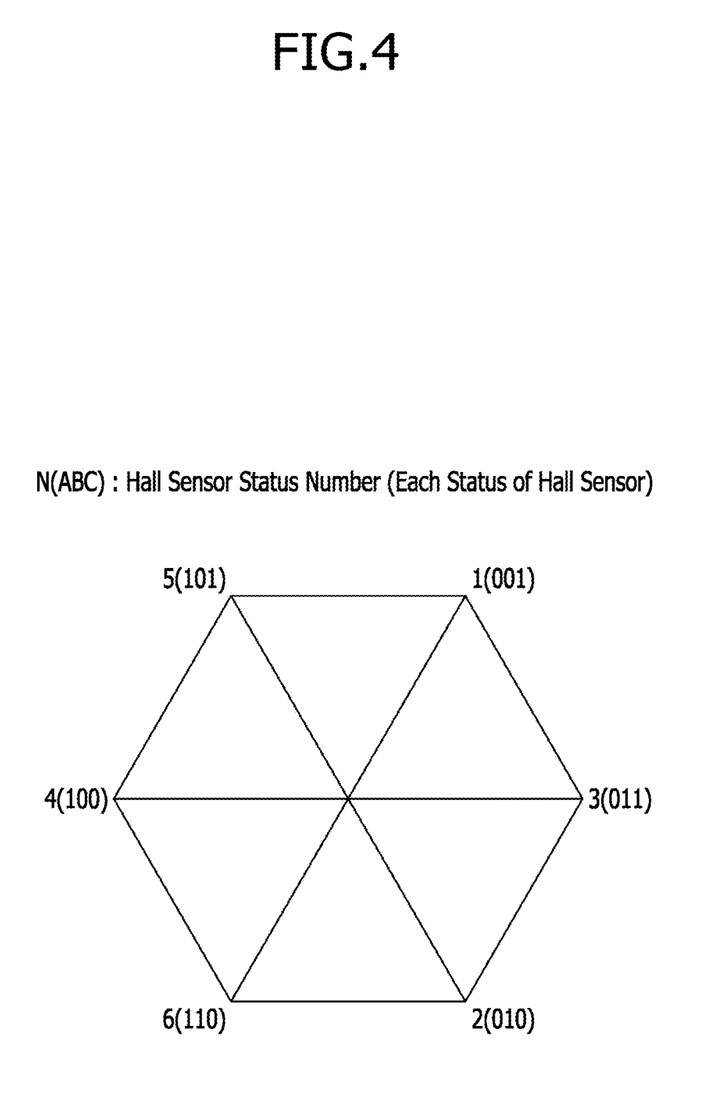
FIG. 4 conceptually illustrates a fault detection process for a hall sensor in accordance with the embodiment of the present invention.

FIG. 1 is a block diagram illustrating a control apparatus of an MDPS system in accordance with an embodiment of the present invention, FIG. 2 illustrates torques depending on the magnitudes of d- and q-axis currents during motor current vector control in accordance with the embodiment of the present invention, FIG. 3 illustrates torque sensor output signals depending on position errors when a d-axis current frequency is applied in accordance with the embodiment of the present invention, and FIG. 4 conceptually illustrates a fault detection process for a hall sensor in accordance with the embodiment of the present invention.

Referring to FIG. 1, the control apparatus of an MDPS system in accordance with the embodiment of the present invention may include a torque sensor 40, a current supply unit 50, a torque signal processing unit 60, an encoder fault determination unit 70, a hall sensor fault determination unit 80 and a motor control unit 90.

The torque sensor 40 may be installed on a steering shaft to sense a torque of the steering shaft. The torque sensor 40 may include a torque & angle sensor (TAS).

Typically, the MDPS system serves to assist a driver's steering force through a motor 30.

In a steering mechanism 10 of the MDPS system, a steering wheel may be connected to the steering shaft. The torque sensor 40 may be installed on the steering shaft, and sense a torque of the steering shaft.

The steering shaft may have a steering gear box installed thereon. A rack bar coming out of the steering gear box may be connected to a tie rod, and the tie rod may be connected to a tire through a knuckle arm. A pinion gear in the steering gear box may be rotated to move the rack bar, and the rack bar may sequentially move the tie rod and the knuckle arm in order to steer the tire.

The motor 30 may be driven according to a current supplied from the current supply unit 50, and provide an assist steering force to the steering wheel. The motor 30 may drive a steering gear unit 20 having a worm gear to provide an assist torque to the steering wheel. The motor 30 of the MDPS system may include a brushless DC (BLDC) motor and the like. The assist torque may be calculated from a vehicle velocity and torque sensed by the torque sensor 40.

The current supply unit 50 may supply a preset frequency and magnitude of current to the motor 30. The current supply unit 50 may include a current frequency injection unit 52 and a motor current control unit 51.

The current frequency injection unit 52 may inject the preset frequency and magnitude of current to a d-axis of the motor 30. The frequency of the current injected by the current frequency injection unit 52 may be set to a higher value than a frequency generated by a driver's steering effort.

As the frequency of the current injected by the current frequency injection unit 52 is set to a higher value than the frequency generated by the driver's steering effort, the torque signal processing unit 60 can easily calculate the magnitude of a torque signal generated by the current of the current frequency injection unit 52.

The motor current control unit 51 may couple the current injected by the current frequency injection unit 52 to a current applied to the d-axis of the motor 30, and perform current vector control to apply currents to the d- and q-axes of the motor 30. That is, the motor current control unit 51 may perform proportional integral (PI) control on the d- and q-axes in order to drive the motor 30 through the current vector control technique.

Referring to FIG. 2, when a position of a motor rotor is accurately sensed by an encoder or hall sensor (not illustrated), the magnitude of the q-axis current may decide a torque of the motor 30, and the magnitude of the d-axis current may have no influence on the torque of the motor 30. However, when a position of the motor rotor is not accurately sensed by the encoder, a torque may be generated in proportion to the magnitude of an error. That is, as the error between the motor rotor position sensed by the encoder and the actual position of the motor rotor becomes larger, the motor 30 may generate a larger torque due to the d-axis current.

Therefore, when the preset frequency and magnitude of current is coupled to the d-axis current and supplied to the motor 30 through the current supply unit 50, the motor 30 may generate a torque in proportion to the error between the motor rotor position sensed by the encoder and the actual position of the motor rotor. At this time, the torque sensor 40 may sense the torque of the motor 30, and determine whether a fault has occurred in the encoder, based on the magnitude of the torque signal sensed by the torque sensor 40, that is, the magnitude of a current ripple.

The torque signal processing unit 60 may process the signal outputted from the torque sensor 40, and calculate the magnitude of the torque signal generated through the current applied by the motor current control unit 51.

The torque signal sensed by the torque sensor 40 may contain a torque ripple (high-frequency signal) caused by the current injected by the current frequency injection unit 52 and a torque ripple caused by the driver's steering effort. When the frequency of the current injected by the current frequency injection unit 52 of the current supply unit 50 is higher than the frequency generated by the driver's steering effort, the torque signal processing unit 60 may calculate the magnitude of the torque signal through a signal processing technique, based on the current injected by the current frequency injection unit 52 of the current supply unit 50.

Referring to FIG. 3, the magnitude of the torque signal generated through the current injected by the current frequency injection unit 52 may increase as the error between the currently known position of the motor rotor or the finally sensed position of the motor rotor and the actual position of the motor rotor is larger. In this case, the magnitude of the torque signal may be maximized when the error is 90 degrees.

The encoder fault determination unit 70 may determine whether a fault has occurred in the encoder, using the torque signal outputted from the torque signal processing unit 60 or the torque ripple.

More specifically, when the preset frequency and magnitude of current is injected, the encoder fault determination unit 70 may store the magnitude of a torque ripple for each encoder angle error into a lookup table in advance or calculate the magnitude of a torque ripple in real time.

Then, the encoder fault determination unit 70 may compare the calculated or stored magnitude of the torque ripple caused by the encoder fault to the magnitude of the torque signal inputted from the torque signal processing unit 60 or the ripple signal, thereby detecting an error in magnitude between the torque ripple and the torque signal.

Then, the encoder fault determination unit 70 may compare the detected error to a preset error. When the detected error is equal to or more than the preset error, the encoder fault determination unit 70 may determine that a fault has occurred in the encoder.

When the motor 30 is controlled, the magnetic flux direction needs to be matched with and the d-axis. When the finally sensed position of the motor rotor does not coincide with the actual position of the motor rotor, a phase difference may occur between the d-axis and the magnetic flux direction. At this time, when a current is applied to the d-axis of the motor 30, a torque may be generated. Therefore, when the preset frequency and magnitude of current is applied while the position of the motor rotor does not coincide with the actual position of the motor rotor, a torque may be generated by the current. The torque may be proportional to the magnitude of the encoder angle error. Based on the error in magnitude between the torque ripple and the stored torque ripple, the encoder fault determination unit 70 may determine whether a fault has occurred in the encoder.

The preset error which is compared to the error in magnitude between the torque ripple and the stored torque ripple may serve as a reference value for determining whether a fault has occurred in the encoder. Therefore, when the encoder angle error is equal to or more than the preset error, it may indicate that the magnitude of the torque signal is significantly large. Thus, the encoder fault determination unit 70 may determine that a fault has occurred in the encoder.

The hall sensor fault determination unit 80 may determine whether a fault has occurred in the hall sensor, depending on one or more of the torque outputted from the torque sensor 40 and a status value of the hall sensor.

Referring to FIG. 4, when 111 or 000 is sensed as a status value of the hall sensor except for six hall sensor status values of 001, 101, 100, 110, 010 and 011 which may occur while the hall sensor is normal, the hall sensor fault determination unit 80 may sense a hall sensor stuck fault.

Furthermore, when the value of the hall sensor is not changed because a fault occurred at the first or second phase of the hall sensor while the motor 30 was rotating, an error may occur between a motor rotor position sensed by the hall sensor and the actual position of the motor rotor. Larger errors may reduce the output torque of the motor 30. Furthermore, when the magnitude of the error reaches 90 degrees, the output torque of the motor 30 may be close to 0. That is because, although a current is applied to the q-axis in the logic illustrated in FIG. 2, it has the same effect as the current is applied to the d-axis of the motor 30. Therefore, while an effort torque required for a driver's steering operation is significantly increased, the torque sensed by the torque sensor 40 may significantly rise, compared to during a normal steering operation.

Thus, when the status value of the hall sensor is not changed and the torque sensed by the torque sensor 40 is larger by a preset value or more than a preset normal range, the hall sensor fault determination unit 80 may determine that a motor position locking fault occurred.

The motor control unit 90 may acquire the position of the motor rotor according to the determination results of the hall sensor fault determination unit 80 and the encoder fault determination unit 70, and control the operation of the motor 30.

That is, when the hall sensor fault determination unit 80 determines that a fault has occurred in the hall sensor and the encoder fault determination unit 70 determines that the encoder is normal, the motor control unit 90 may control the motor 30 based on the motor rotor position measured by the encoder.

Furthermore, when the hall sensor fault determination unit 80 determines that the hall sensor is normal and the encoder fault determination unit 70 determines that a fault has occurred in the encoder, the motor control unit 90 may control the motor 30 based on the motor rotor position measured by the hall sensor.

Furthermore, when the hall sensor fault determination unit 80 determines that a fault has occurred in the hall sensor and the encoder fault determination unit 70 determines that a fault has occurred in the encoder, the motor control unit 90 may estimate a position of the motor rotor, and control the motor 30 based on the estimated position of the motor rotor.

In this case, the motor control unit 90 may detect a position value corresponding to the magnitude of the torque signal inputted from the torque signal processing unit 60, and apply the detected position value to the finally detected position of the motor rotor, in order to estimate the position of the motor rotor.

Since a torque is generated by the preset magnitude frequency and magnitude of current and proportional to the magnitude of an encoder angle error, the above-described position value may be set in advance, according to the magnitude of the torque signal. Thus, the motor control unit 90 may estimate the position of the motor rotor through an operation for setting an error of the motor rotor to 0, for example, the operation for applying the detected position value to the finally detected position of the motor rotor.

For example, when the finally detected position of the motor rotor is −30 degrees and a fault has occurred in the encoder and the hall sensor, the motor control unit 90 may detect a position value corresponding to the magnitude of the torque signal, for example, 30 degrees, and add the position value corresponding to the magnitude of the torque signal to the finally detected position of the motor rotor, thereby estimating the actual position of the motor rotor. The motor control unit 90 may continuously estimate the position of the motor rotor, even though the position of the motor rotor is changed by the operation of the bar motor which repeats the above-described process.

Hereafter, the operation process of the control apparatus of the MDPS in accordance with the embodiment of the present invention will be described.

First, the current frequency injection unit 52 of the current supply unit 50 may inject a preset frequency and magnitude of current to the d-axis of the motor 30. The frequency of the current injected by the current frequency injection unit 52 may be set to a higher frequency than a frequency generated by a driver's steering effort.

The motor current control unit 51 of the current supply unit 50 may couple the current injected by the current frequency injection unit 52 to a current applied to the d-axis of the motor 30, and perform current vector control to apply currents to the d- and q-axes of the motor 30, thereby driving the motor 30.

As an error between a motor rotor position sensed by the encoder and an actual position of the motor rotor becomes larger, the motor 30 may generate a larger torque due to the d-axis current.

At this time, the torque sensor 40 may sense a torque of the steering shaft. The torque signal sensed by the torque sensor 40 may contain a torque ripple (high-frequency signal) caused by the current injected by the current frequency injection unit 52 of the current supply unit 50 and a torque ripple caused by the driver's steering effort.

The torque signal processing unit 60 may process the signal outputted from the torque sensor 40, and calculate the magnitude of the torque signal generated through the current applied by the motor current control unit 51.

The encoder fault determination unit 70 may determine whether a fault has occurred in the encoder, using the torque signal outputted from the torque signal processing unit 60 or a torque ripple. That is, when the preset frequency and magnitude of current is injected, the encoder fault determination unit 70 may store the magnitude of a torque ripple for each encoder angle error into the lookup table in advance or calculate the magnitude of a torque ripple in real time, and compare the magnitude of the torque ripple caused by the encoder fault to the magnitude of the torque signal inputted from the torque signal processing unit 60, thereby detecting an error in magnitude between the torque ripple and the torque signal.

Then, the encoder fault determination unit 70 may compare the detected error to a preset error. When the detected error is equal to or more than the preset error, the encoder fault determination unit 70 may determine that a fault has occurred in the encoder.

When a status value corresponding to a preset fault determination value is sensed except for six hall sensor status values which may occur when the hall sensor is normal, the hall sensor fault determination unit 80 may determine that a fault has occurred in the hall sensor.

Furthermore, when the status value of the hall sensor is not changed and the torque sensed by the torque sensor 40 is larger by a preset value or more than a preset normal range, the hall sensor fault determination unit 80 may determine that a motor position locking fault occurred.

Finally, the motor control unit 90 may acquire the position of the motor rotor according to the determination results of the hall sensor fault determination unit 80 and the encoder fault determination unit 70, and control the operation of the motor 30.

That is, when it is determined that a fault has occurred in the hall sensor and the encoder is normal, the motor control unit 90 may control the motor 30 based on the motor rotor position measured by the encoder. When it is determined that the hall sensor is normal and a fault has occurred in the encoder, the motor control unit 90 may control the motor 30 based on the motor rotor position measured by the hall sensor.

Furthermore, when the hall sensor fault determination unit 80 determines that a fault has occurred in the hall sensor and the encoder fault determination unit 70 determines that a fault has occurred in the encoder, the motor control unit 90 may estimate a position of the motor rotor, and control the motor 30 based on the estimated position of the motor rotor. That is, the motor control unit 90 may detect a position value corresponding to the torque signal inputted from the torque signal processing unit 60, and apply the detected position value to the finally detected position of the motor rotor, in order to estimate the position of the motor rotor.

As such, the control apparatus of an MDPS system in accordance with the embodiment of the present invention can determine whether a fault occurred in the hall sensor and the encoder that sense a position of the motor rotor, and estimate a position of the motor rotor according to the determination result, thereby normally controlling the motor 30 even when a fault has occurred in the hall sensor and the encoder.

Furthermore, the control apparatus can estimate a position of the motor rotor when the hall sensor and the encoder have broken down, thereby improving the fail safety of the MDPS system.

The control apparatus of an MDPS system in accordance with the embodiment of the present invention may comprise a controller. And the controller may be implemented with a processor such as an ECU (Electronic Control Unit). At this time, the controller may include a plurality of processors. That is, each of the torque signal processing unit 60, the encoder fault determination unit 70, the hall sensor fault determination unit 80 and the motor control unit 90 may be implemented as an individual processor. Alternatively, the functions of the controller may be distributed to one or more processors. For example, the torque signal processing unit 60, the encoder fault determination unit 70 may be implemented on a single processor. In this case, each of the functions of the torque signal processing unit 60, the encoder fault determination unit 70 may be configured in the form of a control algorithm or logic.

Figure 5:
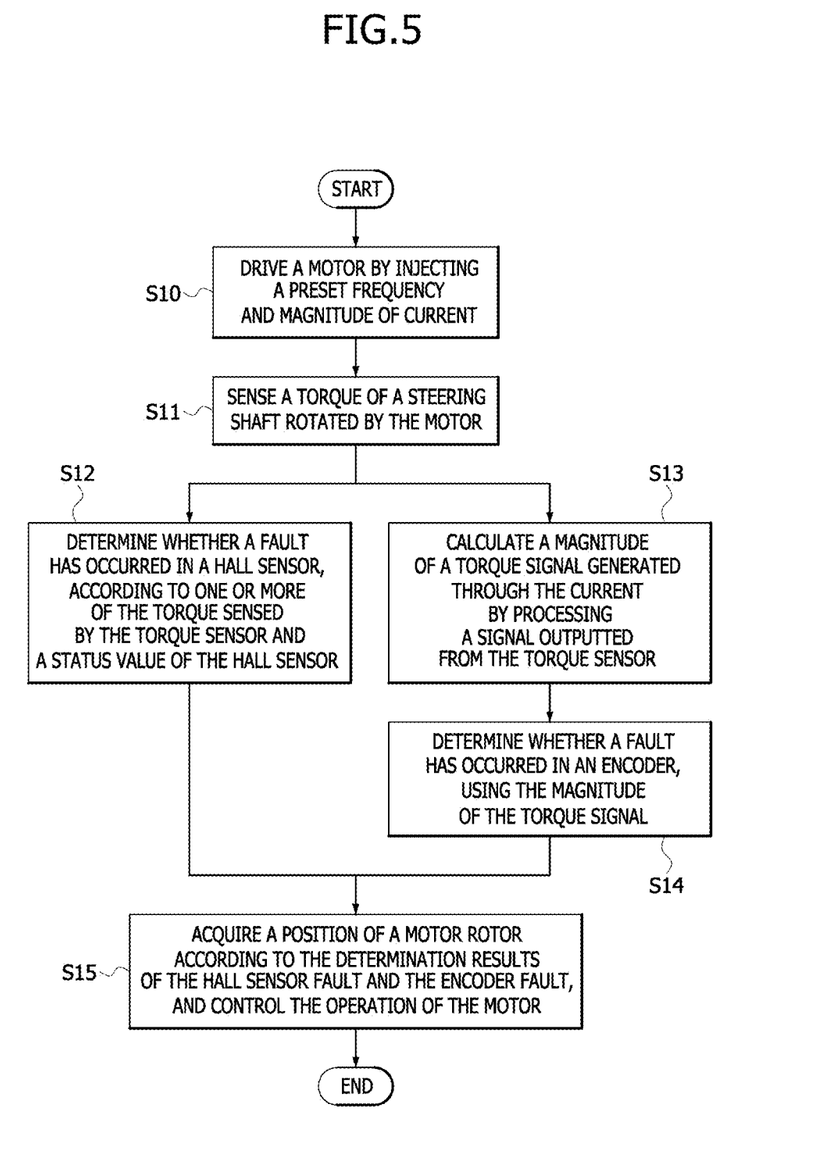
FIG. 5 is a flowchart for describing a control method of an MDPS system in accordance with an embodiment of the present invention.

FIG. 5 is a flowchart for describing a control method of an MDPS system in accordance with an embodiment of the present invention.

As illustrated in FIG. 5, the supply unit may drive a motor by injecting a preset frequency and magnitude of current, at step S10.

Then, the torque sensor may sense a torque of a steering shaft rotated by the motor, at step S11.

After step S11, the controller may determine whether a fault has occurred in a hall sensor, according to one or more of the torque sensed by the torque sensor and a status value of the hall sensor, at step S12.

And the controller may calculate a magnitude of a torque signal generated through the current by processing a signal outputted from the torque sensor, at step S13.

After step S13, the controller may determine whether a fault has occurred in an encoder, using the magnitude of the torque signal, at step S14.

Then, the controller may acquire a position of a motor rotor according to the determination results of the hall sensor fault and the encoder fault, and control the operation of the motor, at step S15.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A motor driven power steering (MDPS) system for a vehicle, the MDPS system comprising:
a motor configure to drive a steering shaft of the vehicle;
a current supply configured to apply a current to operate the motor;
a torque sensor connected to the steering shaft and configured to output a torque signal according to rotation of the steering shaft, wherein the torque signal comprises a first ripple caused by the current and a second ripple caused by steering effort of a driver of the vehicle;
a hall sensor connected to the motor and configured to output a hall sensor signal according to rotation of the motor;
an encoder connected to the motor and configured to output an encoder signal according to rotation of the motor; and
at least one controller configured to acquire a position of a rotor of the motor using the torque signal, the hall sensor signal and the encoder signal and further configured to control the current supply using the position of the rotor,
wherein, in acquiring the position of the rotor, the controller is configured:
to determine whether the hall sensor is at fault based on at least one of the torque signal and a status value of the hall sensor;
to determine whether the encoder is at fault based on the torque signal;
when it is determined that the hall sensor is at fault and the encoder is normal, to acquire the position of the rotor using the encoder signal;
when it is determined that the encoder is at fault and the hall sensor is normal, to acquire the position of the rotor using the hall sensor signal; and
when it is determined that both of the encoder and the hall sensor are at fault, to calculate a magnitude of the first ripple of the torque signal caused by the current applied to the motor and to estimate the position of the rotor based on the calculated magnitude.

2. The MDPS system of claim 1, wherein the at least one controller is configured to determine a position value corresponding to the calculated magnitude, and configured to estimate the position of the motor rotor by applying the detected position value to a finally detected position of the rotor.

3. The MDPS system of claim 1, wherein the at least one controller is configured to determine a fault in the hall sensor; when the status value of the hall sensor corresponds to a preset fault determination value.

4. The MDPS system of claim 1, wherein the at least one controller is configured to determine a fault in the hall sensor, when the status value of the hall sensor is not changed and a torque sensed by the torque sensor is larger by a preset value than a preset normal range.

5. The MDPS system of claim 1, wherein the current supply comprises:
a current frequency injection unit configured to inject a current of a preset frequency and magnitude to a d-axis of the motor; and
a motor current control unit configured to couple the current injected by the current frequency injection unit to a current applied to the d-axis of the motor, and configured to perform current vector control to apply a current to the d- and q-axes of the motor.

6. The MDPS system of claim 1, wherein the at least one controller is configured to determine a fault in the encoder using a lookup table storing magnitude of a torque ripple for an encoder fault.

7. A method for controlling a motor driven power steering (MDPS) system of a vehicle, the method comprising:
receiving, by at least one controller, a torque signal from a torque sensor connected to a steering shaft of the vehicle as the steering shaft rotates,
receiving, by the at least one controller, a hall sensor signal from a hall sensor connected to a motor of the MDPS system as the motor rotates;
receiving, by the at least one controller, an encoder signal from an encoder connected to the motor as the motor rotates;
acquiring, by the at least one controller, a position of a rotor of the motor using the torque signal, the hall sensor signal and the encoder signal; and controlling, by the at least one controller, a current supplied from a current supply to the motor using the position of the rotor,
wherein the at least one controller determines whether at least one of the hall sensor and the encoder is at fault,
wherein when it is determined that the hall sensor is at fault and the encoder is normal the at least one controller acquires the position of the rotor using the encoder signal,
wherein when it is determined that the encoder is at fault and the hall sensor is normal the at least one controller acquires the position of the rotor using the hall sensor signal,
wherein the torque signal comprises a first ripple caused by the current applied to the motor and a second ripple caused by steering effort of a driver of the vehicle,
wherein when it is determined that both of the encoder and the hall sensor are at fault, in acquiring the position of the rotor, the at least one controller calculates a magnitude of the torque signal generated by the current applied to the motor and estimates the position of the rotor based on the calculated magnitude,
when it is determined that both of the encoder and the hall sensor are at fault, to calculate a magnitude of the first ripple of the torque signal caused by the current applied to the motor and to estimate the position of the rotor based on the calculated magnitude.

* * * * *